(12) United States Patent
Ball et al.

(10) Patent No.: US 7,016,608 B1
(45) Date of Patent: Mar. 21, 2006

(54) OPTICAL NETWORK UNITS PRECONFIGURED TO ACCEPT PREDETERMINED SUBSETS OF WAVELENGTHS

(75) Inventors: Peter Raymond Ball, Pinner (GB); Ian Robert Wright, Pinner (GB); Michael Robert Handley, Hillingdon (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/914,575

(22) PCT Filed: Mar. 3, 2000

(86) PCT No.: PCT/GB00/00757

§ 371 (c)(1),
(2), (4) Date: Dec. 3, 2001

(87) PCT Pub. No.: WO00/52865

PCT Pub. Date: Sep. 8, 2000

(30) Foreign Application Priority Data

Mar. 3, 1999 (GB) .................................. 9904894

(51) Int. Cl.
H04J 14/00 (2006.01)

(52) U.S. Cl. .................. 398/71; 398/58; 398/79; 398/72; 398/70

(58) Field of Classification Search ............ 398/58–73, 398/78
See application file for complete search history.

(56) References Cited

U.S. PATENT DOCUMENTS

| | | | |
|---|---|---|---|
| 5,659,351 A | | 8/1997 | Huber |
| 5,745,269 A | * | 4/1998 | Chawki et al. ............ 398/59 |
| 5,815,295 A | * | 9/1998 | Darcie et al. ............. 398/72 |
| 6,032,185 A | * | 2/2000 | Asano ..................... 709/227 |
| 6,411,410 B1 | * | 6/2002 | Wright et al. ............. 398/79 |

FOREIGN PATENT DOCUMENTS

| | | |
|---|---|---|
| EP | 0 382 431 | 8/1990 |
| EP | 0 520 494 | 12/1992 |
| GB | 2 291 299 | 1/1996 |

(Continued)

OTHER PUBLICATIONS

Koonen, Ton, et al., "TOBASCO: An Innovative Approach for Upgrading CATV Fiber-Coax Networks for Broadband Interactive Services", IEEE Communications Magazine, Apr. 1997, pp. 76-81.

(Continued)

Primary Examiner—Agustin Bello
Assistant Examiner—David Lee
(74) Attorney, Agent, or Firm—Staas & Halsey LLP

(57) ABSTRACT

An optical network is provided which comprises a plurality of optical network units (19) and optical source means (3) connected and arranged to transmit light signals to each of the plurality of optical network units (19). The optical source means (3) are capable of transmitting light signals at one or more of a plurality of different wavelengths and at least one optical network unit (19) is operable to accept more than one of the said wavelengths. Further, each wavelength of the plurality is accepted by at least one of the optical network units (19) such that each such wavelength is accepted by a different subset of optical network units (19). The optical network further comprises control means (18) operable to cause the optical source means (3) to transmit light signals at one or more selected such wavelengths corresponding to respective desired subsets of the optical network units (19).

26 Claims, 23 Drawing Sheets

FOREIGN PATENT DOCUMENTS

| | | |
|---|---|---|
| GB | 2 316 252 | 2/1998 |
| GB | 2 329 291 | 3/1999 |
| WO | 88/10037 | 12/1988 |

OTHER PUBLICATIONS

Iannone, P. P., et al., "Broadcast Digital Video Delivered Over WDM Passive Optical Networks", IEEE Photonics Technology Letters, vol. 8, No. 7, Jul. 1996.

Handley, M.R., et al., "Comparison and Simulation of Wavelength Allocation Algorithms on Passive Optical Netwoks", IEEE Colloquim on Multiwavelength Optical Networks: Devices, Systems and Networks Implementations, Jun. 1998.

* cited by examiner

Figure 4

|  | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ |
|---|---|---|---|---|---|---|---|---|---|---|
| $ONU_1$ | ▓ | ▓ | ▓ | ▓ | ▓ |  |  |  |  |  |
| $ONU_2$ | ▓ | ▓ | ▓ | ▓ | ▓ |  |  |  |  |  |
| $ONU_3$ |  | ▓ | ▓ | ▓ | ▓ | ▓ |  |  |  |  |
| $ONU_4$ |  |  | ▓ | ▓ | ▓ | ▓ | ▓ |  |  |  |
| $ONU_5$ |  |  |  | ▓ | ▓ | ▓ | ▓ | ▓ |  |  |
| $ONU_6$ |  |  |  |  | ▓ | ▓ | ▓ | ▓ | ▓ |  |
| $ONU_7$ |  |  |  |  |  | ▓ | ▓ | ▓ | ▓ | ▓ |
| $ONU_8$ |  |  |  |  |  | ▓ | ▓ | ▓ | ▓ | ▓ |

FIGURE 6

| Laser 1 tuning | Laser 2 tuning | ONU served by laser 1 | ONUs served by laser 2 |
|---|---|---|---|
| $\lambda_1$ | $\lambda_6$ | 1-2 | 3-8 |
| $\lambda_2$ | $\lambda_7$ | 1-3 | 4-8 |
| $\lambda_3$ | $\lambda_8$ | 1-4 | 5-8 |
| $\lambda_4$ | $\lambda_9$ | 1-5 | 6-8 |
| $\lambda_5$ | $\lambda_{10}$ | 1-6 | 7-8 |

FIGURE 7

| Laser 1 tuning | Laser 2 tuning | ONU served by laser 1 | ONUs served by laser 2 |
|---|---|---|---|
| $\lambda_1$ | $\lambda_8$ | 1 | 2-8 |
| $\lambda_2$ | $\lambda_9$ | 1-2 | 3-8 |
| $\lambda_3$ | $\lambda_{10}$ | 1-3 | 4-8 |
| $\lambda_4$ | $\lambda_{11}$ | 1-4 | 5-8 |
| $\lambda_5$ | $\lambda_{12}$ | 1-5 | 6-8 |
| $\lambda_6$ | $\lambda_{13}$ | 1-6 | 7-8 |
| $\lambda_7$ | $\lambda_{14}$ | 1-7 | 8 |

FIGURE 8

| Laser 1 tuning | Laser 2 tuning | ONU served by laser 1 | ONUs served by laser 2 |
|---|---|---|---|
| $\lambda_1$ | $\lambda_4$ | 1-3 | 4-8 |
| $\lambda_2$ | $\lambda_5$ | 1-4 | 5-8 |
| $\lambda_3$ | $\lambda_6$ | 1-5 | 6-8 |

FIGURE 9

| Laser 1 tuning | Laser 2 tuning | ONU served by laser 1 | ONUs served by laser 2 |
|---|---|---|---|
| $\lambda_1$ | $\lambda_5$ | 1-4 | 5-8 |
| $\lambda_2$ | $\lambda_6$ | 2-5 | 6-8,1 |
| $\lambda_3$ | $\lambda_7$ | 3-6 | 7-8,1-2 |
| $\lambda_4$ | $\lambda_8$ | 4-7 | 1-3,8 |

FIGURE 10

|  | $\lambda_1$ | $\lambda_2$ | $\lambda_3$ | $\lambda_4$ | $\lambda_5$ | $\lambda_6$ | $\lambda_7$ | $\lambda_8$ |
|---|---|---|---|---|---|---|---|---|
| ONU 1 | ■ |  |  |  |  |  | ■ | ■ |
| ONU 2 | ■ | ■ |  |  |  |  | ■ | ■ |
| ONU 3 | ■ | ■ | ■ |  |  |  |  | ■ |
| ONU 4 | ■ | ■ | ■ | ■ |  |  |  |  |
| ONU 5 |  | ■ | ■ | ■ | ■ |  |  |  |
| ONU 6 |  |  | ■ | ■ | ■ | ■ |  |  |
| ONU 7 |  |  |  | ■ | ■ | ■ | ■ |  |
| ONU 8 |  |  |  |  | ■ | ■ | ■ | ■ |

FIGURE 11

| Laser 1 tuning | Laser 2 tuning | ONU served by laser 1 | ONUs served by laser 2 |
|---|---|---|---|
| $\lambda_1$ | $\lambda_9$ | 1-3 | 4-8 |
| $\lambda_2$ | $\lambda_{10}$ | 2-4 | 5-8,1 |
| $\lambda_3$ | $\lambda_{11}$ | 3-5 | 6-8,1-2 |
| $\lambda_4$ | $\lambda_{12}$ | 4-6 | 7-8,1-3 |
| $\lambda_5$ | $\lambda_{13}$ | 5-7 | 8,1-4 |
| $\lambda_6$ | $\lambda_{14}$ | 6-8 | 1-5 |
| $\lambda_7$ | $\lambda_{15}$ | 7-8,1 | 2-6 |
| $\lambda_8$ | $\lambda_{16}$ | 8,1-2 | 3-7 |

FIGURE 12

| | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ |
|---|---|---|---|---|---|---|---|---|---|---|---|---|---|---|---|---|
| 1 | ■ | | | | | | ■ | ■ | | ■ | ■ | ■ | ■ | ■ | | |
| 2 | ■ | ■ | | | | | | ■ | | | ■ | ■ | ■ | ■ | ■ | |
| 3 | ■ | ■ | ■ | | | | | | | | | ■ | ■ | ■ | ■ | ■ |
| 4 | | ■ | ■ | ■ | | | | | ■ | | | | ■ | ■ | ■ | ■ |
| 5 | | | ■ | ■ | ■ | | | | ■ | ■ | | | | ■ | ■ | ■ |
| 6 | | | | ■ | ■ | ■ | | | ■ | ■ | ■ | | | | ■ | ■ |
| 7 | | | | | ■ | ■ | ■ | | ■ | ■ | ■ | ■ | | | | ■ |
| 8 | | | | | | ■ | ■ | ■ | ■ | ■ | ■ | ■ | ■ | | | |

Figure 15

|      | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ |
|------|---|---|---|---|---|---|---|---|---|
| ONU₁ | ■ | ■ | ■ |   |   |   |   |   |   |
| ONU₂ |   | ■ | ■ | ■ |   |   |   |   |   |
| ONU₃ |   |   | ■ | ■ | ■ |   |   |   |   |
| ONU₄ |   |   |   | ■ | ■ | ■ |   |   |   |
| ONU₅ |   |   |   |   | ■ | ■ | ■ |   |   |
| ONU₆ |   |   |   |   |   | ■ | ■ | ■ |   |
| ONU₇ |   |   |   |   |   |   | ■ | ■ | ■ |
| ONU₈ |   |   |   |   |   |   | ■ | ■ | ■ |

FIGURE 16

Data sequence:    Data required by ONUs 1,2,3,6 & 7

 Data required by ONUs 4,5 & 8

 Data required by ONUs 2,3,5 & 6

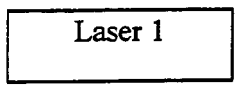  

Laser tuning: $\lambda_1\ \lambda_2\ \lambda_3\ \lambda_4\ \lambda_4\ \lambda_2\ \lambda_3\ \lambda_2\ \lambda_3\ \lambda_4\ \lambda_1\ \lambda_2\ \lambda_3$

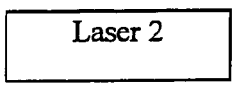  

Laser tuning: $\lambda_6\ \lambda_7\ \lambda_5\ \lambda_8\ \lambda_5\ \lambda_8\ \lambda_5\ \lambda_6\ \lambda_5\ \lambda_6\ \lambda_5\ \lambda_8\ \lambda_6\ \lambda_7$

FIGURE 17

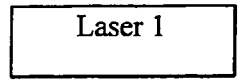  

Laser tuning: $\lambda_3$

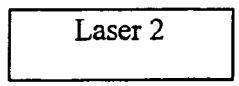  

Laser tuning: $\lambda_8$

| Channel | % of total viewers |
|---|---|
| ITV | 31.4 |
| BBC 1 | 23.9 |
| Channel 4 | 6.6 |
| Sky 1 | 5.2 |
| BBC 2 | 4.9 |
| Sky Sports | 3.4 |
| Sky Movies | 3.4 |
| The Movie channel | 3.2 |

Percentage of CATV subscribers viewing at different times of the day

Percentage bandwidth saving against number of customers per ONU

OPTICAL NETWORK UNITS PRECONFIGURED TO ACCEPT PREDETERMINED SUBSETS OF WAVELENGTHS

BACKGROUND OF THE INVENTION

1. Field of the Invention

This invention relates to optical networks.

2. Description of the Related Art

FIG. 1A of the accompanying drawings shows in block diagram form the basic components of a passive optical network (PON). A multiwavelength optical source 3, located in a central office 1, transmits light signals consisting of multiple discrete wavelengths $\lambda_1 \ldots \lambda_N$ down an optical fibre 10 to a wavelength division multiplexer (WDM) 7, located in a remote node 5, which then distributes the signals to a set of optical network units (ONUs) 9, via separate fibres 11. The network is described as passive since the optical routing components (such as the WDM 7) cannot actively be controlled or tuned during their operational use.

The wavelength division multiplexer 7 may be one of a variety of types. An example of a simple multiplexer is a power-splitting star coupler which simply splits incoming light into all ports equally; it is the trivial case of wavelength division multiplexing, because no selection is made on the basis of wavelength, and consequently all-wavelengths $\lambda_1 \ldots \lambda_N$ are distributed to all ONUs 9, as illustrated in FIG. 1B of the accompanying drawings. This arrangement is sometimes referred to as "broadcast-and-select", since each signal is broadcast to multiple ONUs 9, and each ONU 9 then selects only those signals intended for it.

Instead of such a power-splitting star coupler, a wavelength routing element, for example an arrayed waveguide grating (AWG), could be used. An AWG splits incoming light into spectral constituents, launching them onto separate output fibres. In this way, with an appropriately-designed AWG, incoming light consisting of wavelengths $\lambda_1 \ldots \lambda_N$ could be multiplexed into N separate branches each consisting of light of only one of those wavelengths, as illustrated in FIG. 1C of the accompanying drawings. In this way, each ONU 9 would only receive signals intended for that ONU, and each output branch would receive all the incoming power for its designated wavelength, unlike the star coupler where there is a splitting of power. Note that the architecture in FIG. 1C shows the case where there are the same number of ONUs 9 as there are wavelengths emitted from the source 3, but this is not necessary; for example an ONU 9 could receive more than one of the routed wavelengths.

FIG. 2 of the accompanying drawings shows an example of a recently-proposed two-stage wavelength-routed PON architecture having a multiwavelength optical source 3 at the optical line termination (OLT) emitting discrete wavelengths $\lambda_{11} \ldots \lambda_{MN}$ down fibre 10. In the illustrated architecture there is one coarse AWG 4 located in an exchange 2, and M remote nodes 5, each having a fine AWG 7. Each fine AWG 7 feeds N ONUs 9, so that there are a total of M×N ONUs 9.

The coarse AWG 4 is designed to direct multiple wavelengths down each branch 6, and these wavelengths are then separated by the fine AWGs 7 and directed individually to each ONU 9 via the branches 11. This is achieved by ensuring that the free spectral range of the coarse AWG 4 is equal to the spacing of N channels received by the branches 11.

For example, using the illustrated architecture of FIG. 2, the coarse AWG 4 receives at its input all wavelengths $\lambda_{11} \ldots \lambda_{MN}$ emitted from the source 3. It directs wavelengths $\lambda_{11} \ldots \lambda_{1N}$ down the first branch 6 to the first remote node 5. The AWG 7 within the first remote node then directs each of the N wavelengths $\lambda_{11} \ldots \lambda_{1N}$ at its input individually to the N respective ONUs 9.

In this architecture, like that of FIG. 1C, each ONU receives only the wavelength assigned to it, and for each wavelength there is no splitting of power at the routing components 4, 7.

The multiwavelength optical source 3 may be a single tunable laser located in the optical line termination (OLT) of fibre 10, constantly retuning and transmitting a different wavelength in different time slots. This scheme uses WDM principally to improve the privacy in the network; there is no increase in capacity over a single wavelength system as only one wavelength is transmitted every time slot. The downstream protocol is effectively the same as a time division multiplexed (TDM) single wavelength system.

The above-described architectures of FIGS. 1C and 2 are fixed wavelength systems, since a wavelength is permanently assigned to each branch of the PON, effectively creating a number of independent single wavelength networks within the same PON. This type of scheme is simple to implement but does not allow the redistribution of bandwidth in response to fluctuations in demand. For example, if the n'th ONU 9, permanently assigned wavelength $\lambda_n$, is idle for a long period of time, then that wavelength $\lambda_n$ is being wasted since it cannot be re-allocated to another ONU 9.

Dynamic assignment schemes seek to allow more flexible use of bandwidth by introducing tunability into the network. The most obvious way to provide downstream wavelength re-allocation is to have tunable filters in the ONUs 9, in a broadcast-and-select architecture such as that of FIG. 1B where each ONU 9 receives more than one wavelength. The ONUs 9 of the PON would tune to the wavelength assigned to it in response to a signal from the central office 1.

There is, however, a major drawback with this approach to dynamic assignment of wavelengths, which is that the information about current bandwidth requirements is held at the central office 1, and is separated from the location of the tunable components in the ONUs 9. Therefore when a retuning is required, a signal needs to be sent from central office 1 to the appropriate ONU 9, and an acknowledgement returned, before data destined to that ONU 9 can be transmitted on the new wavelength. As retuning is normally done in response to the overloading of a wavelength channel, this lag causes a build up of traffic and consequent increase in delay on that channel.

The present applicant has considered employing more than one tunable laser at central office 1 (the "head end") in a fixed wavelength PON so as to achieve a certain degree of dynamic bandwidth assignment without the use of tunable filters in the ONUs 9. With multiple tunable lasers, transmission to the ONUs 9 could be shared between the lasers. Each laser could be assigned its own set of ONUs to which to transmit, and consequently when the load on a particular laser is increased, for example due to an increase in demand from a particular ONU 9, responsibility for transmission to that ONU could be transferred to another less loaded laser. The effect would be effectively to transfer the tunability in the network from the ONUs to the head end.

There would be a number of advantages in doing this. Firstly, the tuning would be done with tunable transmitters rather than filters, the former currently having a faster tuning speed. Secondly, all the protocol functions would be controlled at the head end. Consequently, having the tuning there would mean that there is no delay between the tuning becoming necessary and it being implemented. This could stop traffic build up on an overloaded transmitter as discussed above. Thirdly, the system would be more robust; if the tuning is at the ONU 9 then either an acknowledgement of successful retuning is required, resulting in further delay, or there is the risk of an error in retuning resulting in the loss of cells transmitted to the ONU 9 on the new wavelength. Fourthly, the more expensive, tunable components would be placed at the head end, where only a few are required, rather than providing expensive tunable systems at each ONU; this would lead to a cost reduction.

There are still certain drawbacks, however, to such a fixed-filter, tunable-laser approach. Firstly, cells could be addressed to more than one ONU 9. This means that bandwidth would be wasted when the network transmits broadcast or multicast traffic, because the cell needs to be replicated and retransmitted on the wavelength of each destination ONU 9. In contrast, a system with tunable filters at the ONU could be configured so that all the ONUs 9 in a multicast group can be tuned to the same channel. Secondly, constant retuning of the lasers at the head end would be required. Consequently, if the tuning time is non-negligible, then a loss of bandwidth would result.

It is therefore desirable to provide a multiwavelength, broadcast-and-select optical network which combines head end tuning with efficient transmission of broadcast and multicast traffic.

SUMMARY OF THE INVENTION

According to an embodiment of a first aspect of the present invention there is provided an optical network comprising: a plurality of optical network units; and optical source means connected and arranged to transmit light signals to each of said plurality of optical network units; wherein the said optical source means are capable of transmitting light signals at one or more of a plurality of different wavelengths, at least one optical network unit being operable to accept more than one of the said wavelengths, and each wavelength of the said plurality being accepted by at least one of the said optical network units such that each such wavelength is accepted by a different subset of optical network units, the optical network further comprising control means operable to cause the said optical source means to transmit light signals at one or more selected such wavelengths corresponding to respective desired subsets of the said optical network units.

According to an embodiment of a second aspect of the present invention there is provided control circuitry for use in an optical network, which network comprises a plurality of optical network units and optical source means connected and arranged to transmit light signals to each of said plurality of optical network units, said optical source means being capable of transmitting light signals at one or more of a plurality of different wavelengths, at least one optical network unit being operable to accept more than one of the said wavelengths, and each wavelength of the said plurality being accepted by at least one of the said optical network units such that each such wavelength is accepted by a different subset of optical network units, the control circuitry being operable to cause the said optical source means to transmit light signals at one or more selected such wavelengths corresponding to respective desired subsets of the said optical network units.

According to an embodiment of a third aspect of the present invention there is provided a dynamic bandwidth assignment method for an optical network comprising optical source means capable of transmitting light signals at one or more of a plurality of different wavelengths, each of the said wavelengths being accepted by a different subset of optical network units of the said network, in which method: light signals are transmitted by the said optical source means at one or more wavelengths, selected from the said plurality of wavelengths, corresponding to one or more desired subsets of optical network units, and, in response to a required bandwidth redistribution, the said one or more wavelengths at which light signals are transmitted by the said optical source means are changed to one or more different wavelengths, selected from the said plurality, which correspond to one or more different desired subsets of optical network units.

BRIEF DESCRIPTION OF THE DRAWINGS

FIG. 4 shows the passband of the filter in each optical network unit of FIG. 3;

FIG. 6 shows the optical network units served by each laser of the FIG. 3 embodiment for various laser tunings;

FIG. 7 shows the optical network units served by each laser in another embodiment of the present invention;

FIG. 8 shows the optical network units served by each laser in a further embodiment of the present invention;

FIG. 9 shows the optical network units served by each laser in a yet further embodiment of the present invention;

FIG. 10 shows the passband of the filter in each optical network unit of the FIG. 9 embodiment;

FIG. 11 shows the optical network units served by each laser in a yet further embodiment of the present invention;

FIG. 12 shows the passband of the filter in each optical network unit of the FIG. 11 embodiment;

FIG. 15 shows the passband of the filter in each optical network unit in another embodiment of the present invention;

FIG. 16 illustrates an example of the required transmissions for a wavelength-routed system not embodying the present invention;

FIG. 17 illustrates the required transmissions for the FIG. 16 example for a staggered filter system embodying the present invention;

DETAILED DESCRIPTION OF THE PREFERRED EMBODIMENTS

Figure 3:
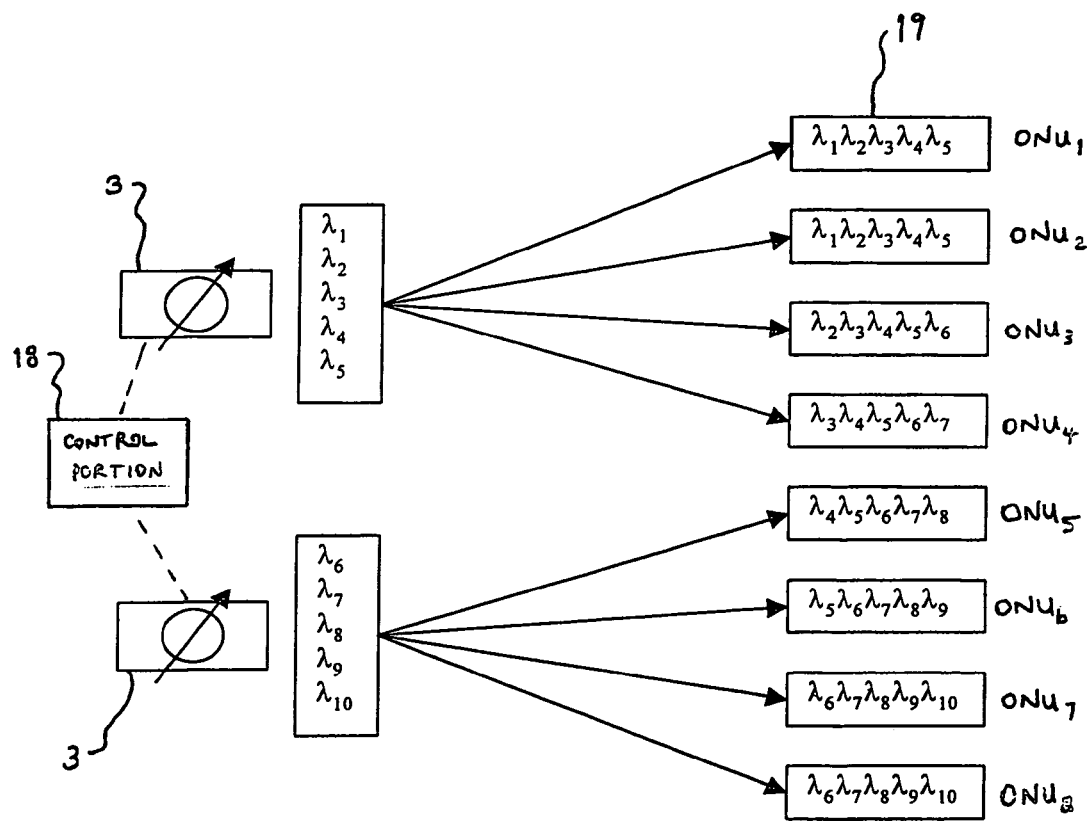
FIG. 3 shows the basic principle of a staggered filter optical network architecture embodying the present invention.

FIG. 3 shows the basic principle of a staggered filter optical network architecture embodying the present invention. In this embodiment, there are two tunable lasers 3 capable of transmitting a total of 10 wavelengths $\lambda_1$ to $\lambda_{10}$ to a total of eight optical network units 19, $ONU_1$ to $ONU_8$. The first tunable laser 3 is capable of transmitting one of five wavelengths $\lambda_1$ to $\lambda_5$, and in the present example is tuned to $\lambda_3$. The second tunable laser is capable of transmitting one of five wavelengths $\lambda_6$ to $\lambda_{10}$, and in the present example is tuned to $\lambda_8$. Control portion 18 is in communication with, and controls the operation of, the tunable lasers 3.

Each optical network unit 19 employs a bandpass filter which allows a group of five consecutive transmitted wavelengths to be passed. For example, as indicated in FIG. 3, $ONU_1$ passes wavelengths $\lambda_1$ to $\lambda_5$, while $ONU_4$ passes wavelengths $\lambda_3$ to $\lambda_7$. The table of FIG. 4 summarises the passband of the filters in each of the ONUs 19, where shaded boxes indicate those wavelengths that are passed by the appropriate filter. It can be seen that, in this embodiment, the passband of neighbouring ONU filters are overlapping and form a staggered progression from one wavelength limit to the other. Each laser transmits to every optical network unit, but since each optical network unit filters out certain wavelengths, not every optical network unit will actually respond to signals of each wavelength.

It is also apparent from the table of FIG. 4 that when the control portion 18 causes the first laser 3 to be tuned to $\lambda_3$ and the second laser 3 to be tuned to $\lambda_8$, all of the ONUs 19 are served by one or other of the lasers, with $ONU_1$ to $ONU_4$ being served by the first laser and $ONU_5$ to $ONU_8$ being served by the second laser. This arrangement is suitable when there is a balanced load, with each laser serving the same number of ONUs. Should there be an increase in demand from $ONU_1$ to $ONU_3$, for example, it is possible with this architecture to perform a limited degree of bandwidth re-distribution by transferring $ONU_4$ from being served by the first laser to being served by the second laser, thereby freeing more time for the first laser to serve the more demanding $ONU_1$ to $ONU_3$.

Figure 5:
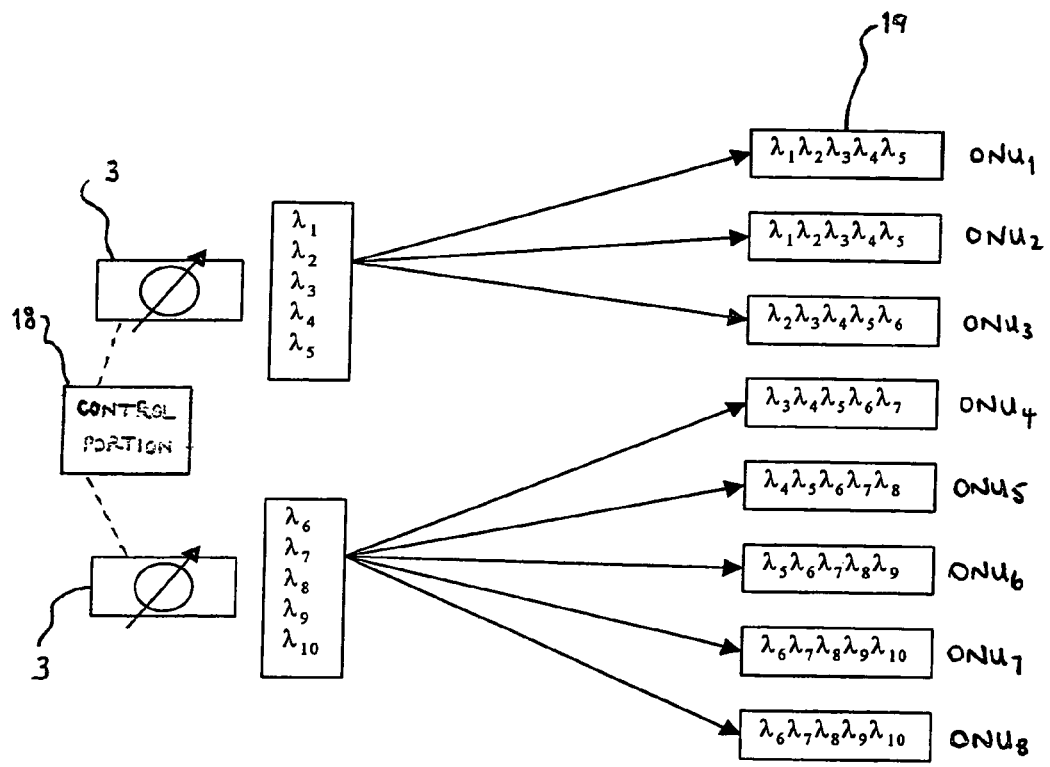
FIG. 5 shows the FIG. 3 optical network architecture when the load is unbalanced.

This is done by making use of the staggered nature of the filters, and by coordinating the retuning of the two lasers. The control portion 18 causes the first laser to be retuned to $\lambda_2$, and the second laser to be retuned to $\lambda_7$, as shown in FIG. 5. Since $ONU_4$ filters out the new first laser wavelength $\lambda_2$, but passes the new second laser wavelength $\lambda_7$, it has effectively been transferred from the first to the second laser. The first laser now transmits only to the first three ONUs 19.

In this way it can be seen that wavelengths are assigned to groups of ONUs 19 rather than uniquely to one. The tunable lasers can target different groups of ONUs by using different wavelengths. By coordinating the retuning of the different lasers, the allocation of ONUs to head end lasers can be changed according to changes in demand distribution. A table showing the listing of the ONU groups and the required laser tunings is shown in FIG. 6, from which it can be seen that tuning the lasers to $\lambda_1$, $\lambda_6$ (or $\lambda_5$, $\lambda_{10}$) produces a 2-6 (6-2) distribution and tuning the lasers to $\lambda_2$, $\lambda_7$ (or $\lambda_4$, $\lambda_9$) produces a 3-5 (5-3) distribution.

The staggered nature of the filters illustrated in FIG. 4 allows a complete coverage of all of the ONUs 19 by transmission on either of two wavelengths. If those two wavelengths are chosen appropriately, then the coverage can be achieved without being able to transmit to any one ONU 19 on both wavelengths; for example $\lambda_1$ and $\lambda_6$, $\lambda_4$ and $\lambda_9$, or $\lambda_5$ and $\lambda_{10}$. In this way the receiver in the ONU 19, which responds to light energy rather than to a particular wavelength, will not receive confusing signals.

There are a large number of ways in which the wavelengths and ONUs can be grouped to allow different re-distributions. There is a trade-off between the number of wavelengths used and the complexity of the filtering arrangements on the one hand and the possible degree of retuning and the consequent network benefits on the other.

The system may be altered to provide greater or less tuning according to the number of wavelengths that are used and the bandwidths of the filters. FIG. 7 shows a table illustrating the use of fourteen wavelengths to produce a system that allows up to seven ONUs 19 to be assigned to one laser, and the table in FIG. 8 shows the scenario of allowing a maximum of five ONUs 19 on each laser, which allows a reduction in the number of wavelengths to six. The filtering requirements would, of course, change with the changing number of wavelengths. In the FIG. 7 case, seven wavelengths would need to be passed by each filter, and in the FIG. 8 case, only three.

Although the above architectures are straightforward in their physical implementation, in certain circumstances there may not be sufficient flexibility in the way that the re-distribution of ONUs 19 to the head end lasers can be done. The problem of fairness arises in that all the ONUs 19 are not treated equally. For example, a surge in demand in one of the central ONUs ($ONU_4$ and $ONU_5$) cannot be compensated by a redistribution in the way that a similar increase in traffic from the "edge" ONUs can be.

In order to allow all the ONUs 19 to be re-distributed from one laser to another, it becomes necessary to allow certain ONUs 19 to receive wavelengths which are not consecutive in the ITU (International Telecommunication Union) grid.

The first example of this principle is a relatively simple one, which allows the re-distribution of any four (out of a group of 8 ONUs 19) consecutively numbered ONUs 19 to each laser using a total of 8 wavelengths. There are always the same number of ONUs 19 per laser, but a degree of flexibility in their distribution is allowed. FIG. 9 shows the wavelength groupings and FIG. 10 shows the filtering requirements. It can be seen from the table of FIG. 10 that the filters in $ONU_1$ to $ONU_3$ pass both low and high wavelengths.

Although this arrangement is relatively straightforward and fair, it can be limited in its ability to provide dynamic bandwidth allocation in certain circumstances. In order to provide more flexibility, a more complex method may be employed. An arrangement of 16 wavelengths that will allow a three-five split between the lasers (i.e. one of the two lasers serves five of the 8 ONUs and the other laser serves the remaining three) is shown in FIGS. 11 and 12.

In order to provide a more complete re-allocation scheme, there can be the option of having four ONUs served by each laser or five on one and three on the other. This can be achieved by using both of the schemes described in FIGS. 9 to 12 in conjunction with each other (i.e. using a total of 24 wavelengths).

Greater flexibility, allowing for the provision of six-two splits, could also be achieved. However, the more re-allocation that is provided, the more wavelengths that are required and the more complex the receiver arrangements at the ONUs.

Figure 1A:
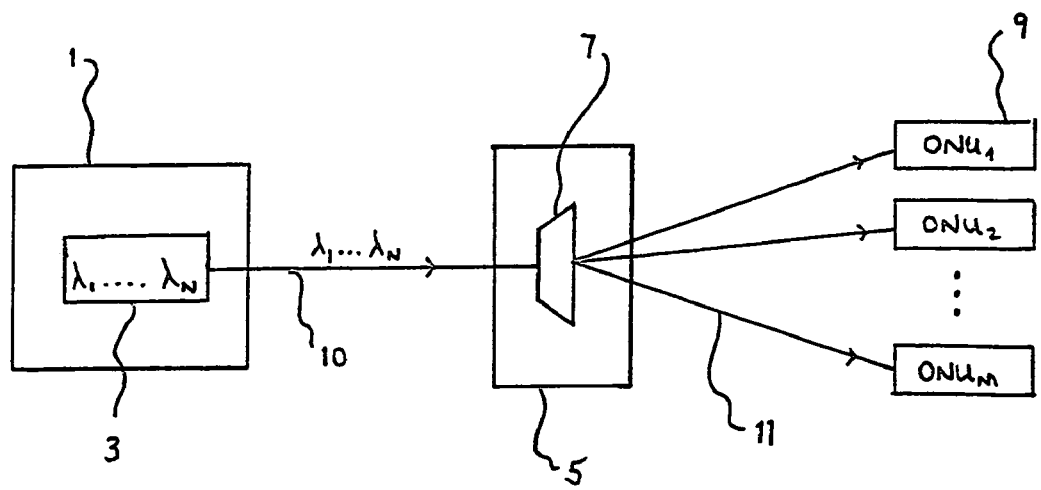
FIG. 1A shows in block diagram form the basic components of a multiwavelength passive optical network.
Figure 1B:
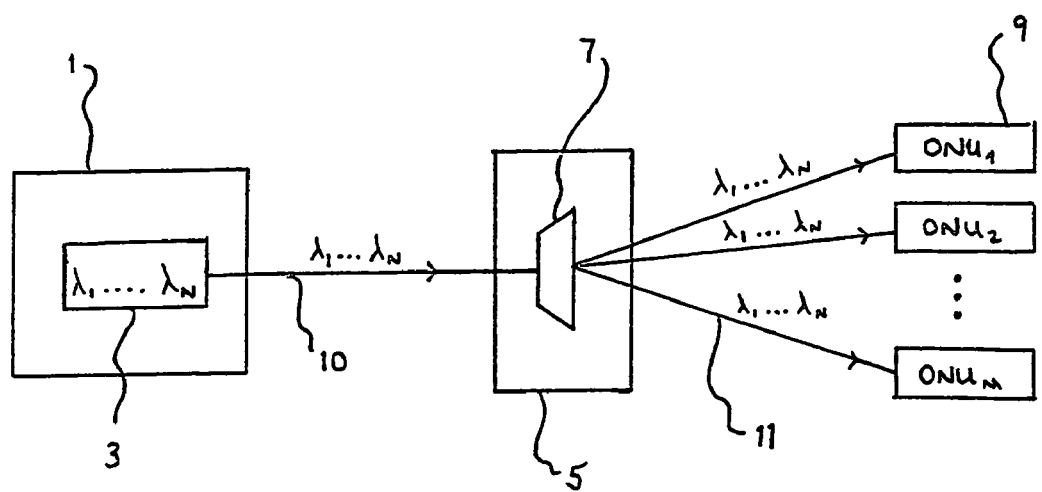
FIG. 1B shows the passive optical network of FIG. 1A employing a power-splitting star coupler.
Figure 1C:
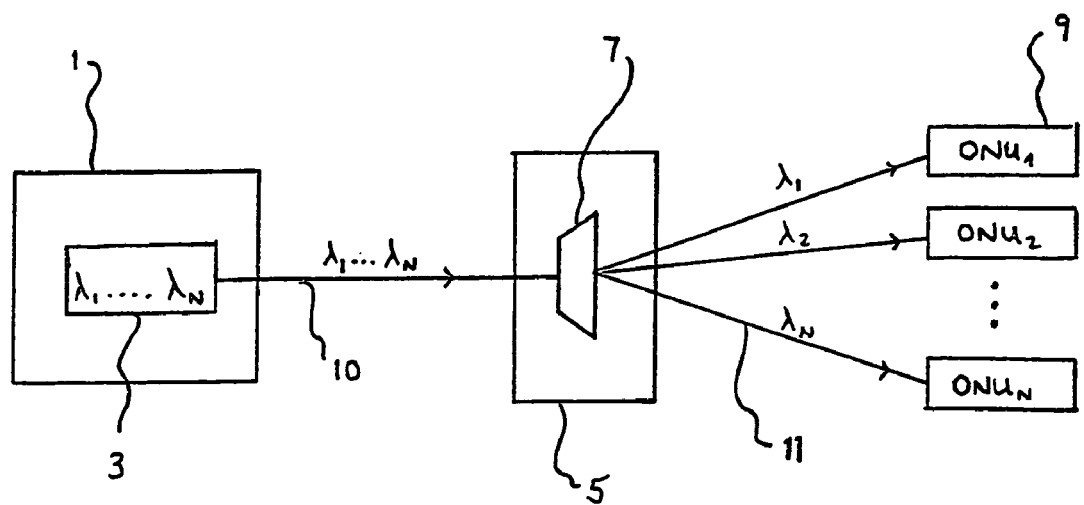
FIG. 1C shows the passive optical network of FIG. 1A employing an arrayed waveguide grating.
Figure 2:
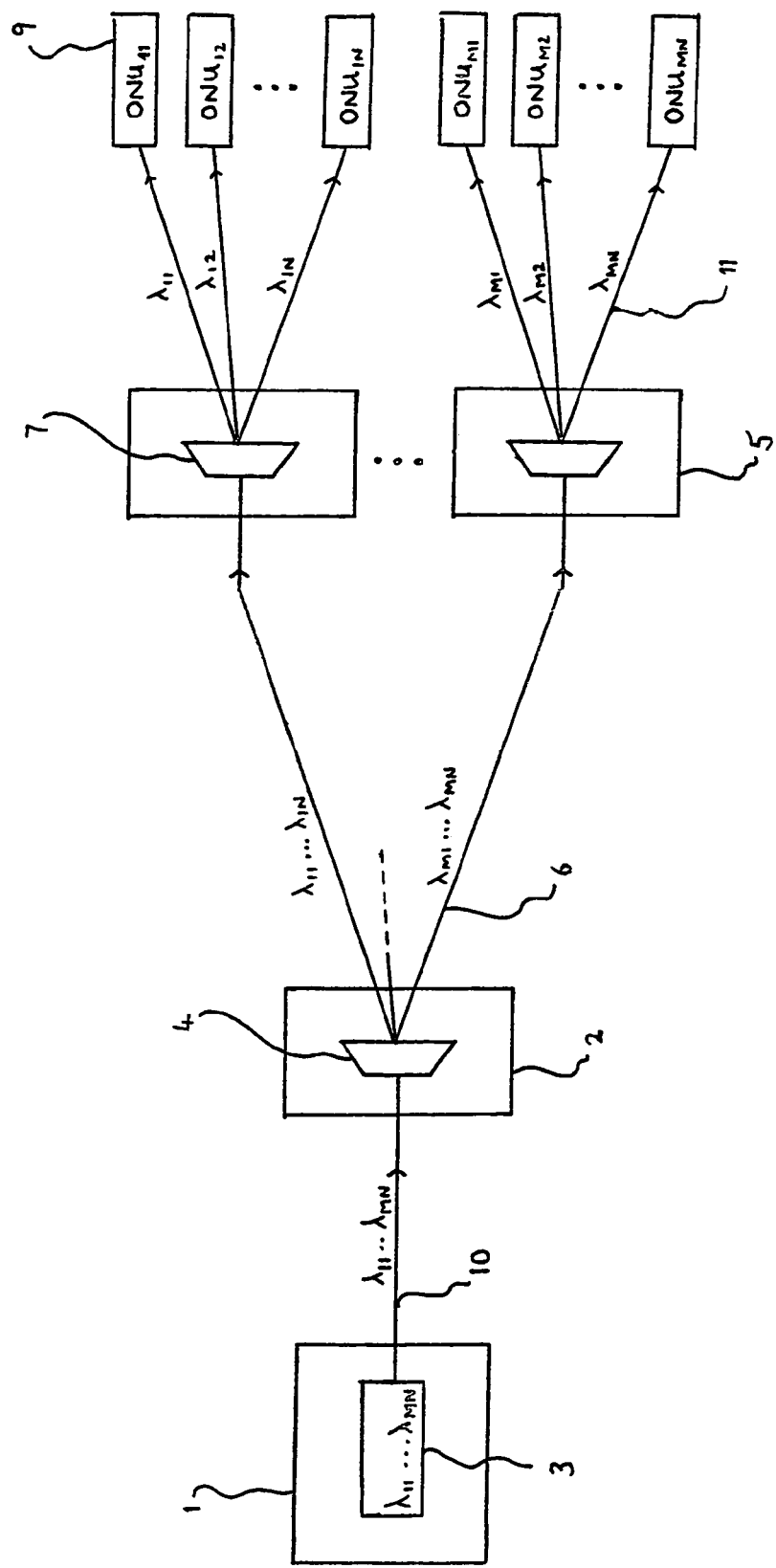
FIG. 2 shows in block diagram form the basic components of a two-stage passive optical network.
Figure 13:
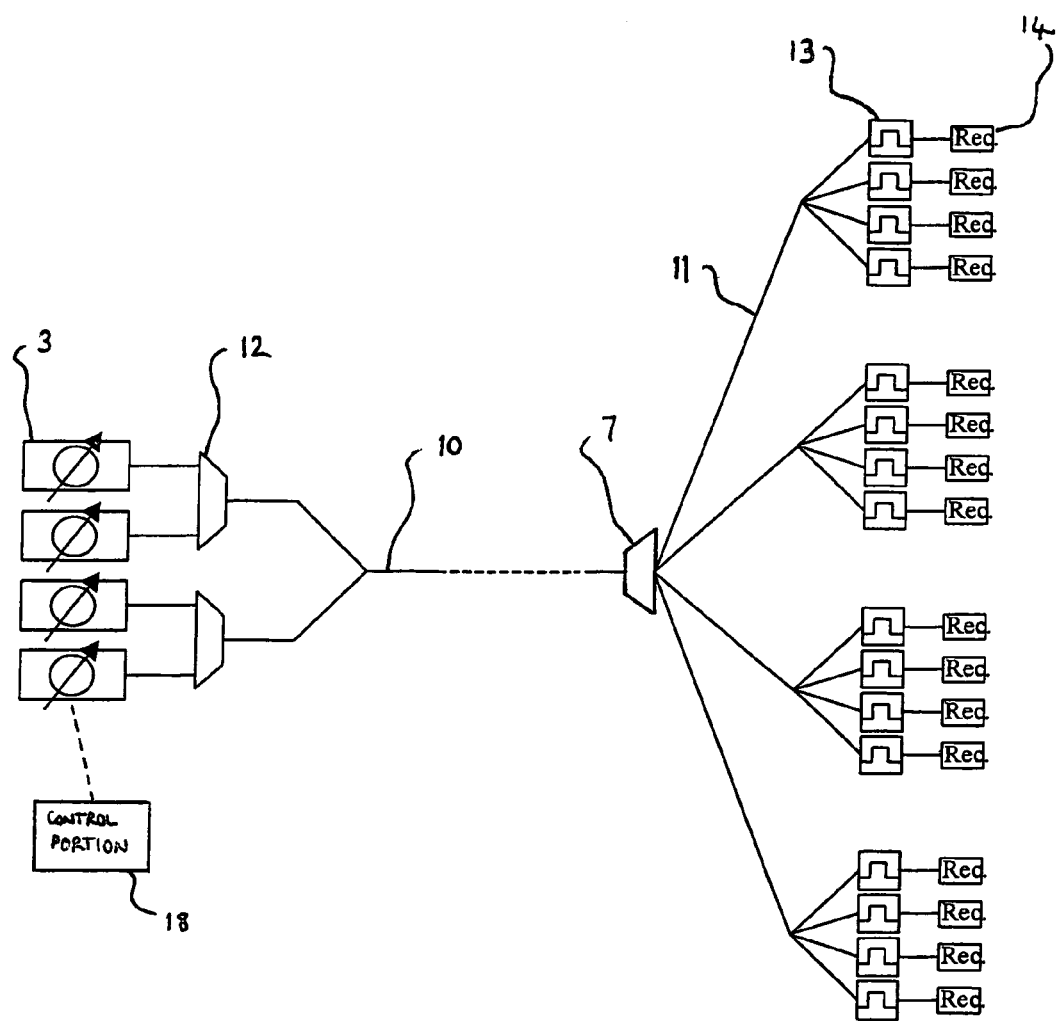
FIG. 13 shows a physical implementation of a staggered filter system embodying the present invention.

FIG. 13 shows a simple physical implementation of the staggered filter scheme. In this example, there are four tunable lasers 3 controlled by control portion 18, and the signals emitted therefrom are multiplexed by multiplexers 12 for transmission down single fibre 10. A passive splitter 7 (such as a power-splitting star coupler described above in relation to FIG. 1B) distributes the signals down branches 11 to the remote units. Appropriately-selected bandpass filters 13 pass only the required wavelengths on to a receiver 14. Each filter/receiver pair may be located, for example, within an optical network unit. Optical amplifiers can also be used along increased optical fibre spans to compensate for any losses or attenuation.

The filtering can be implemented using fixed filters, manually tunable Fabry-Perot filters or slow tunable filters. The first option is the cheapest in terms of component cost, but may cause problems for the network operators if different components are required for each ONU 19.

The most basic form of the staggered filter architecture can be implemented using bandpass filters. The requirements for the optical network detailed in FIG. 4 are for filters with a bandwidth equivalent to 5 wavelengths on the ITU grid and a free spectral range of greater than 40 ITU wavelengths. Since filters with bandwidths between 0.25 and 100 nm are commercially available, this does not pose a problem.

The more flexible architectures (such as those illustrated in FIGS. 9 to 12) cannot be implemented in such a straightforward manner, as the wavelengths they need to receive are not always consecutive in the ITU grid. One way to satisfy a more complicated filtering requirement would be to exploit the periodic nature of optical filters. The architecture in FIG. 10, for example, could be implemented by arranging for $\lambda_1$, $\lambda_2$ and $\lambda_3$ to be in a passband one free spectral range apart from $\lambda_6$, $\lambda_7$ and $\lambda_8$.

Figure 14:
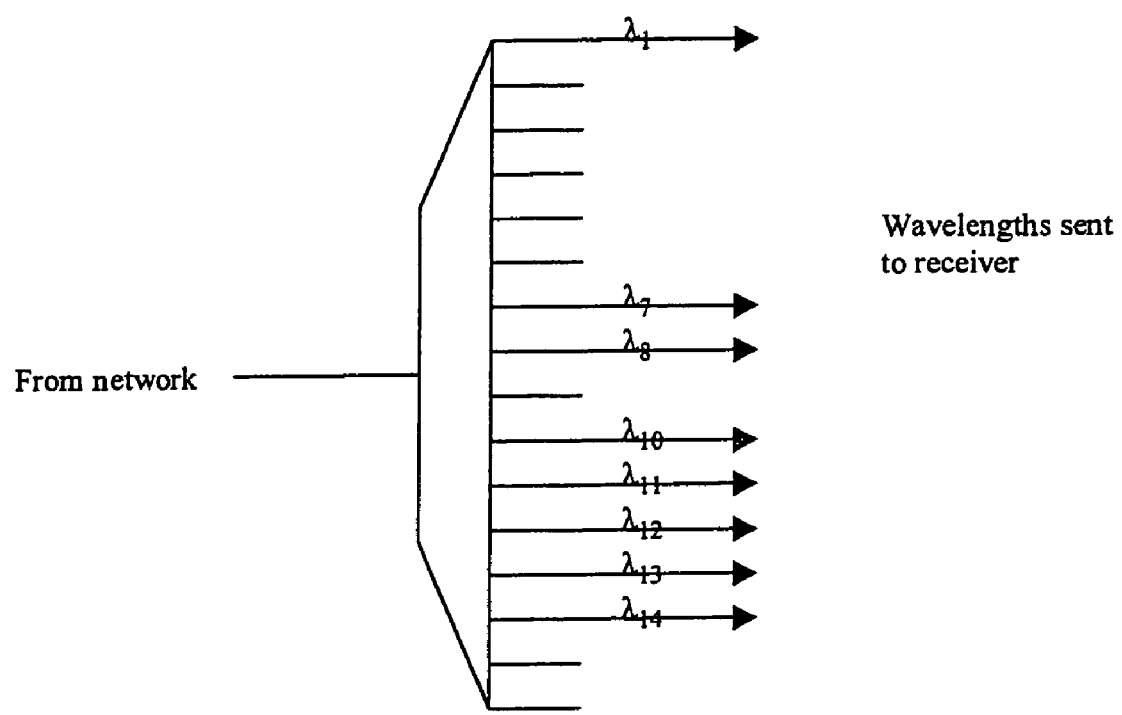
FIG. 14 illustrates the use of a wavelength division demultiplexer as a filter.

For the more complex systems, such as that outlined in FIG. 12, wavelength division demultiplexers can be used to separate and select the incoming wavelengths. The WDM would be able to separate all the wavelengths present in a branch of the optical network, but only the ports carrying the required wavelengths for the particular ONU would be connected to the receiver. The arrangement required for $ONU_1$ in the FIG. 12 architecture is shown in FIG. 14. The selection of wavelengths can be done optically, for example by connecting only the required ports to the receiver, or electronically, by having, for example, a photodiode at each port and only sending the required signals to the receiver amplifiers.

It will be appreciated that, although embodiments of the present invention have been described which employ two or four tunable lasers at the head end, each tuned to a fixed wavelength until bandwidth reallocation is required, other embodiments are not limited to this.

For example, in the FIG. 3 embodiment a single tunable laser capable of emitting all wavelengths $\lambda_1$ to $\lambda_{10}$ could be used instead of the two lasers. The network would then operate in a time division multiplexed manner, with a single wavelength occupying each time slot. In the FIG. 3 example, the single tunable laser would constantly re-tune, transmitting $\lambda_3$ in one time slot and then $\lambda_8$ in another.

In addition, as demonstrated by FIG. 13, other embodiments are not limited to transmission on only two wavelengths at a time. For example, three or more lasers at the head end could be used.

The filtering arrangement shown in FIG. 15 requires the use of three tunable lasers at the head end emitting at three different wavelengths (or one/two tunable lasers operating in a time division multiplexed manner). For example, the three lasers could be tuned to ($\lambda_1, \lambda_4, \lambda_7$) or ($\lambda_2, \lambda_5, \lambda_8$) or ($\lambda_3, \lambda_6, \lambda_9$) respectively to cover completely all ONUs 19.

The issue of multicast traffic has already been raised above, with respect to the wavelength-routed architecture. This type of network has a unique wavelength for each of the ONUs in the system. The wavelength routers at the remote nodes ensure that only data destined to a particular ONU is sent there. Ordinarily a problem would arise when the same data is required to be sent to a number of different ONUs, since then the information has to be replicated on each of the wavelengths of the target ONUs.

With the staggered filter architecture, on the other hand, if there are several ONUs in a wavelength group that require the same data, the data only needs to be transmitted once.

An example of this is shown in FIGS. 16 and 17. FIG. 16 shows a data sequence and the ONUs to which each of the cells in the sequence need to be sent. The required transmissions and the laser tunings needed are shown in FIG. 16 for the wavelength-routed system and FIG. 17 for the staggered filter architecture. It is apparent from FIG. 16 that there can be significant replication of data and a consequent wastage of time in the wavelength-routed system, compared to the staggered filter system transmissions shown in FIG. 17.

It should be noted that there is potential for further improvement if there is a large amount of multicast traffic. This would allow the assignment algorithm to take account of the multicast groups when assigning ONUs to the transmitters.

A quantitative estimate of the benefits of the staggered filter system against the simple addition of extra tunable lasers to the wavelength-routed approach will now be calculated. The approach used here is to assume that there is a given probability of a user being a member of a multicast group. From this, the probability of an ONU containing at least one member of that multicast group is calculated; such an ONU will be referred to as a member ONU. The expectation value of the number of member ONUs in a group served by one tunable laser is determined, and from this, the average number of cell replications saved. The statistics used in the estimate are for Cable TV (CATV), working on the assumption that cells for a given TV channel are sent only to the ONUs where that channel is being watched. The figures are for channels watched at peak viewing hours, based on historical data.

Figures 18, 19:
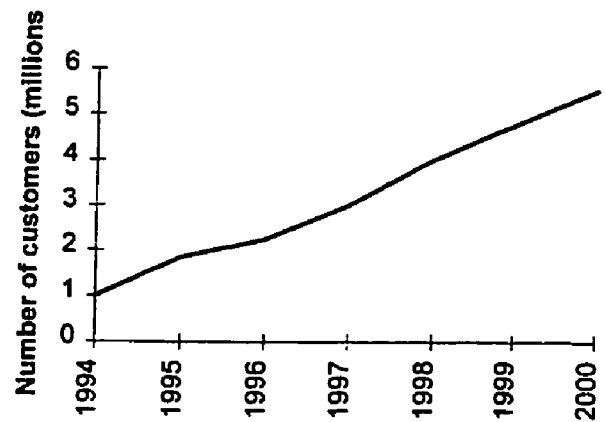
FIG. 18 is a table showing the typical percentage of viewers watching various television channels at the peak viewing hour.
FIG. 19 is a graph showing the penetration rates for cable television.

FIG. 18 shows the percentage of viewers watching the most popular channels at the peak viewing hour (2000–2100). This information can be combined with the penetration rates for cable television (FIG. 19) and the hour by hour average viewing figures (FIG. 20) to calculate the probability of a user on the optical network watching a particular channel on CATV during the peak hour. The optical network configuration being considered here is fibre-to-the-cabinet (FTTCab) in which the ONUs are situated in a street cabinet. Signals to and from customers are multiplexed at the ONU so that, for example, between 8 and 128 customers can be supported per ONU. The next stage is to calculate the probability of a given ONU requiring the channel in question and hence the expectation value of the number of ONUs requiring the channel that are served by a single tunable laser. This figure allows an estimate of the benefits of the staggered filter architecture compared with the wavelength-routed system, as the latter would require a copy of the data for each ONU whereas the former requires only one copy for the group.

Figure 20:
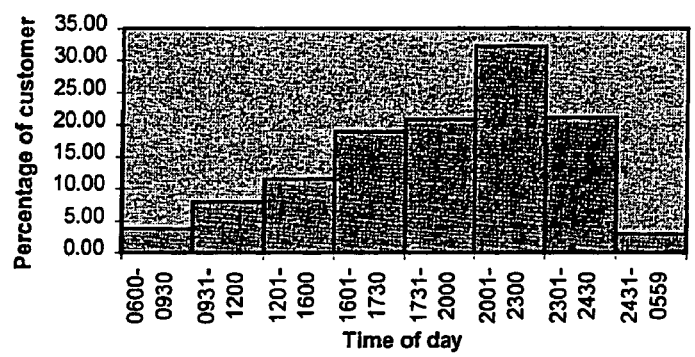
FIG. 20 is a graph showing the hour-by-hour average viewing figures.

The proportion of customers on the optical network with CATV is assumed to be approximately equal to the total number of CATV customers divided by the number of households in the country (around 20 million). This gives a proportion of approximately 0.25. FIG. 20 shows the percentage of customers watching CATV during a 24 hour period. Taking the peak viewing hour figure and combining this with the data shown in FIG. 18 produces statistics for viewing of individual channels.

The bandwidth saving achieved by using the staggered filter system rather than the wavelength-routed architecture can be estimated by the following method.

The probability of any one customer on an ONU using a given channel is calculated by using a binomial distribution. This is given by 1−Prob(no customers watching a given channel).

With a wavelength-routed architecture, the data stream for a TV channel has to be replicated for every ONU requiring the service. For a staggered filter system the data stream need only be transmitted once for each group where one of the ONUs requires the channel. Hence there is a saving equal to the channel bandwidth for each ONU after the first one to require the service in a given group.

It is assumed that the average number of ONUs in a group served by a single tunable laser is eight (four channels serving a standard 32 way split). The saving is then calculated as follows:

$$\text{Saving} = \frac{\sum_{i=2}^{8} (i-1) \times \text{Prob}(i \text{ customers})}{\sum_{i=1}^{8} i \times \text{Prob}(i \text{ customers})}$$

This is then summed over all the channels shown in FIG. 18.

Figure 21:
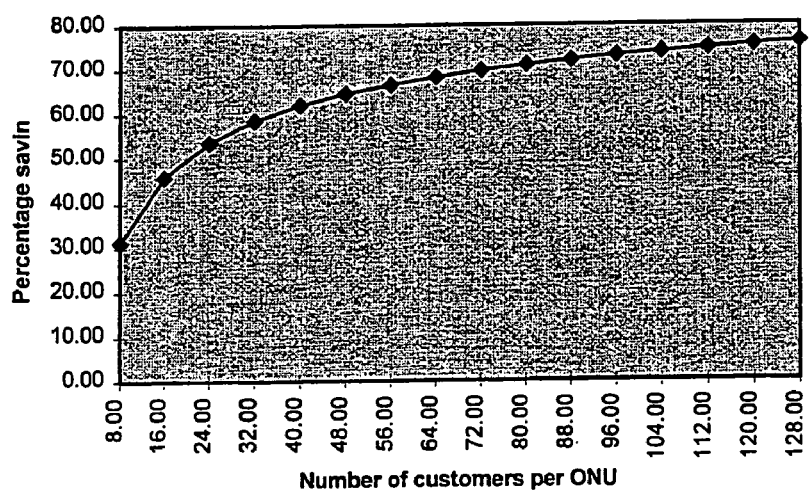
FIG. 21 is a graph showing estimated savings of bandwidth in an embodiment of the present invention.
Figure 22:
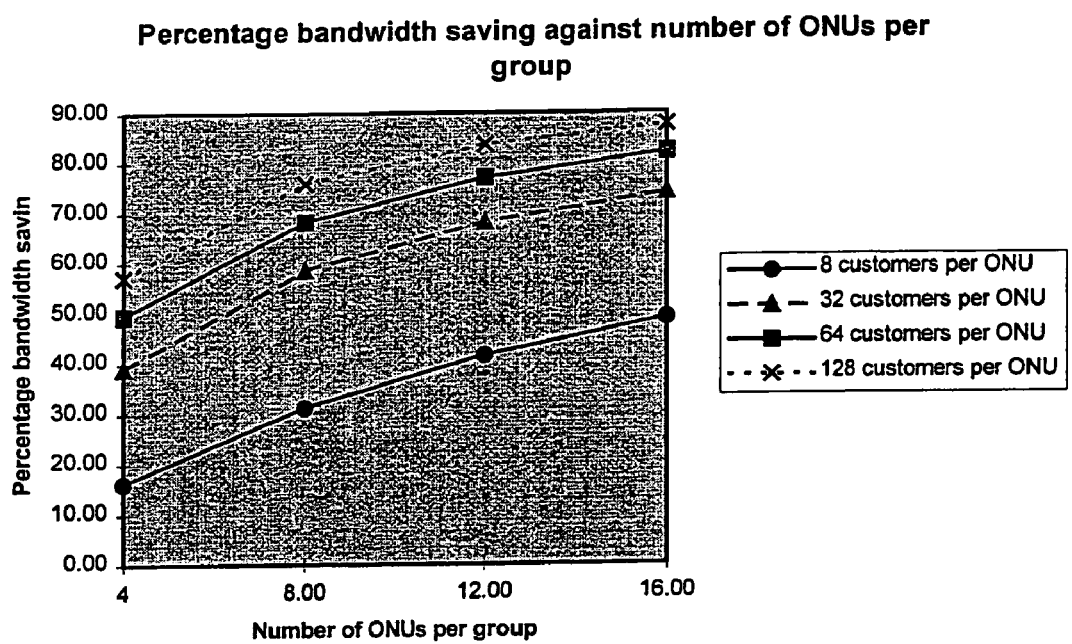
FIG. 22 is another graph showing estimated savings of bandwidth in an embodiment of the present invention.

The estimated savings in bandwidth (in terms of multiples of the channel bandwidth) against the number of customers per ONU are shown in FIG. 21 and range from approximately 30% for 8 customers per ONU up to approximately 75% for 128 customers per ONU. The savings in bandwidth against the number of ONUs per wavelength group are shown in FIG. 22 for various numbers of customers per ONU and range from approximately 15% to 45% for 8 customers per ONU to approximately 55% to 85% for 128 customers per ONU.

The overall saving compared with the total capacity of the system can be calculated by estimating the proportion of the total bandwidth of the system that is used for cable television. Further demand predictions will be required before a conclusion can be fully drawn on the bandwidth savings of the scheme.

One of the features of the wavelength-routed architecture is the need for constant retuning of the laser in order to transmit to different ONUs. The tuning time of the laser is therefore of critical importance. If the tuning latency approaches the transmission time of an ATM cell, then bandwidth will be lost, as time between transmissions will need to be dedicated to retuning. If tuning times are significantly greater than the length of an ATM cell, then the network becomes increasingly impractical.

By contrast, retunings are only needed in the staggered filter architecture in response to changes in the demand on the network, most of which will occur only at call setups.

Tuning times in the order of nanoseconds have been reported in the literature, but commercially-available devices lag behind this. For example, the GEC four section laser is a prototype, expected to be commercially available within the next year. There are two effects which determined the tuning time, namely electronic and thermal. The electronic effects are in the order of 1–10 ns and the thermal effects in the order of ms. The relationship between current and wavelength change is not however linear. Four different currents are used to tune the laser, namely, the gain, coupler, phase and reflector. Work is currently underway to develop algorithms to minimise the changes in each current for any required change in wavelength. In this way, the thermal effects can be reduced, thus reducing the overall tuning times. A tuning time of 500 ns may be possible. Such a time would indicate a gain in bandwidth of approximately 50% for the staggered filter system over the wavelength-routed architecture.

Figure 23:
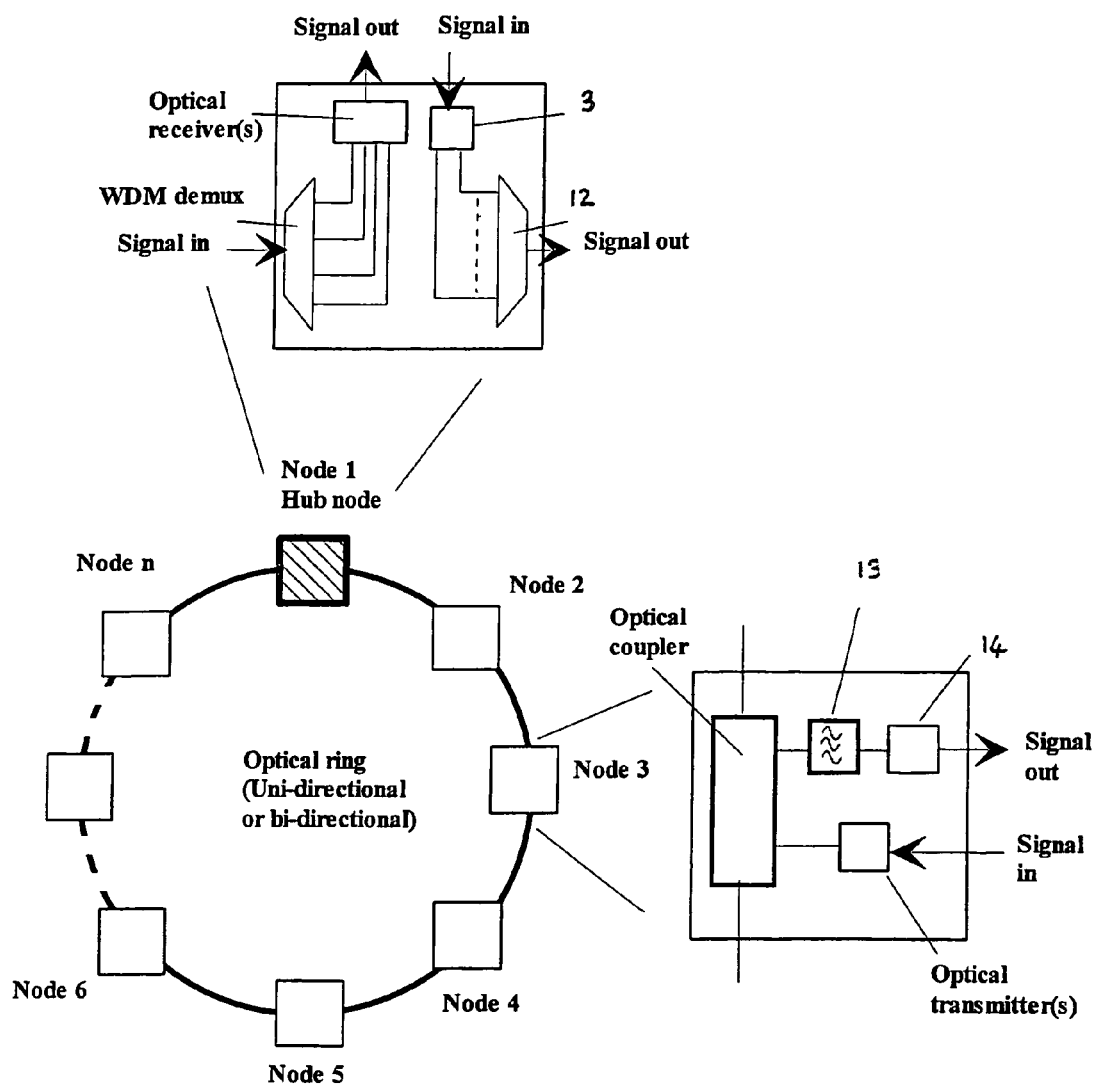
FIG. 23 shows an embodiment of the present invention applied to a ring network architecture.
Figure 24:
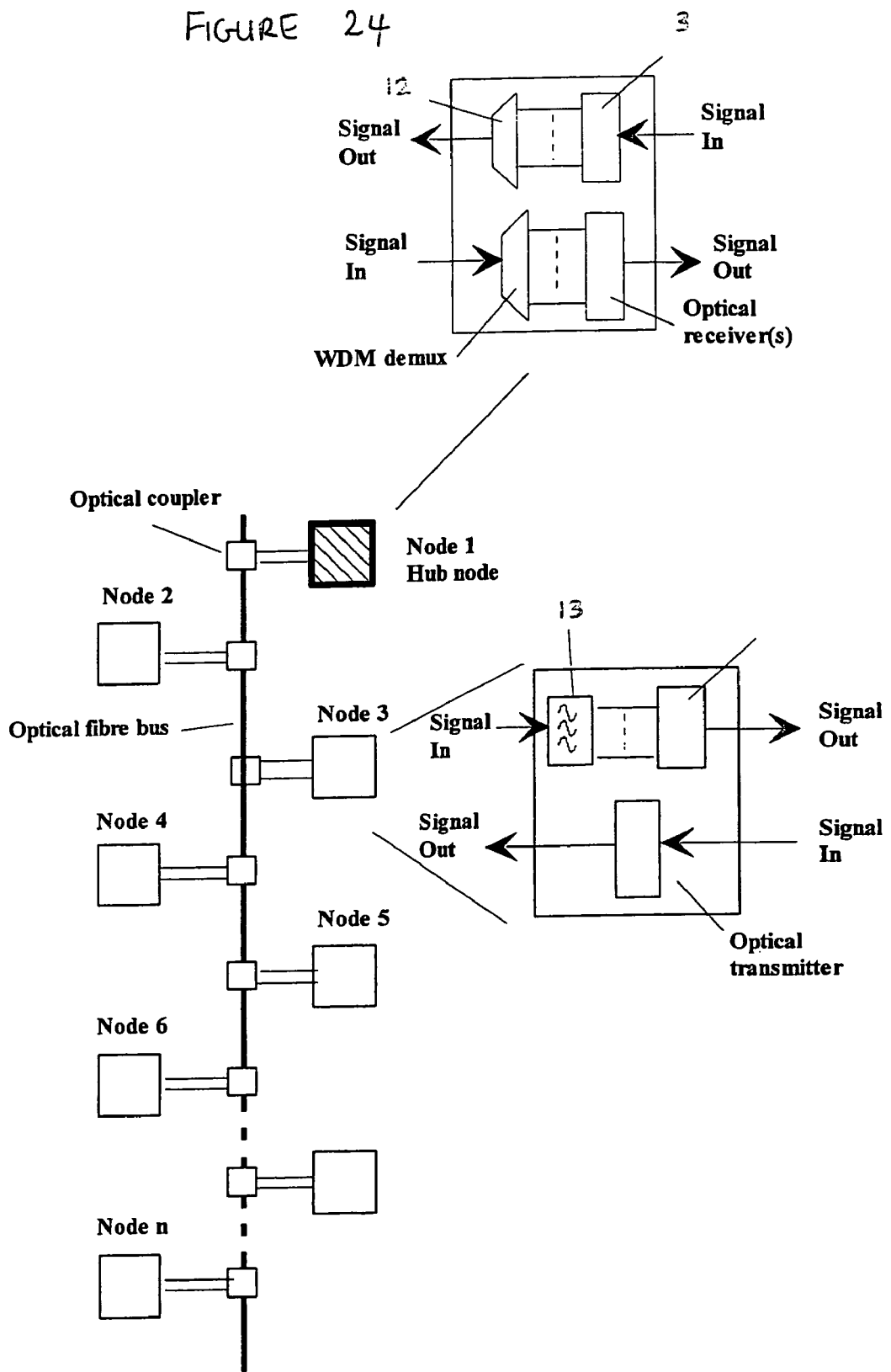
FIG. 24 shows an embodiment of the present invention applied to a bus network architecture.

The above-described arrangements use the staggered filter design with a passive optical network architecture like that shown in FIG. 13. The staggered filter concept can also be applied to other network arrangements (which may contain active components), for example a ring architecture and a bus architecture where the traffic distribution is all to/from one hub node, as shown in FIGS. 23 and 24 respectively. In these Figures, Node 1 is the hub node. It transmits signals at selected wavelengths using a tunable laser source similar to the method described above. Nodes 2 to n in these Figures are designed to access selected wavelengths using the staggered filter approach described above.

The choice of the number of wavelengths available, the number of nodes served and the wavelength selection at each node is the same as that described above.

As for the above-described architectures, the staggered filter arrangement is for 'downstream' traffic only. Upstream traffic can be supported using a separate fibre or the same fibre by using a different wavelength(s).

Figure 25:
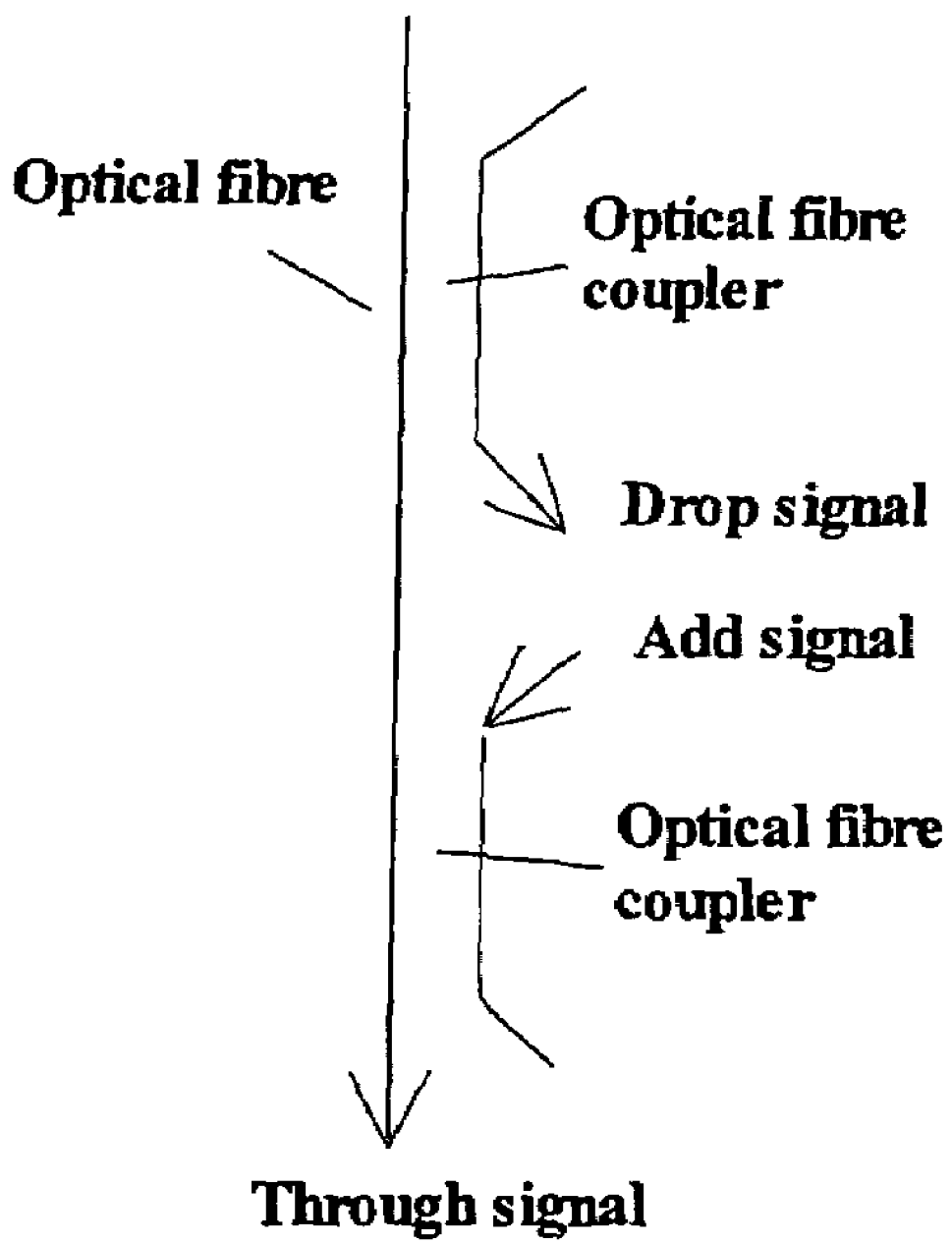
FIG. 25 shows an example of a unidirectional optical coupler for use in the FIG. 23 and FIG. 24 embodiments.
Figure 26:
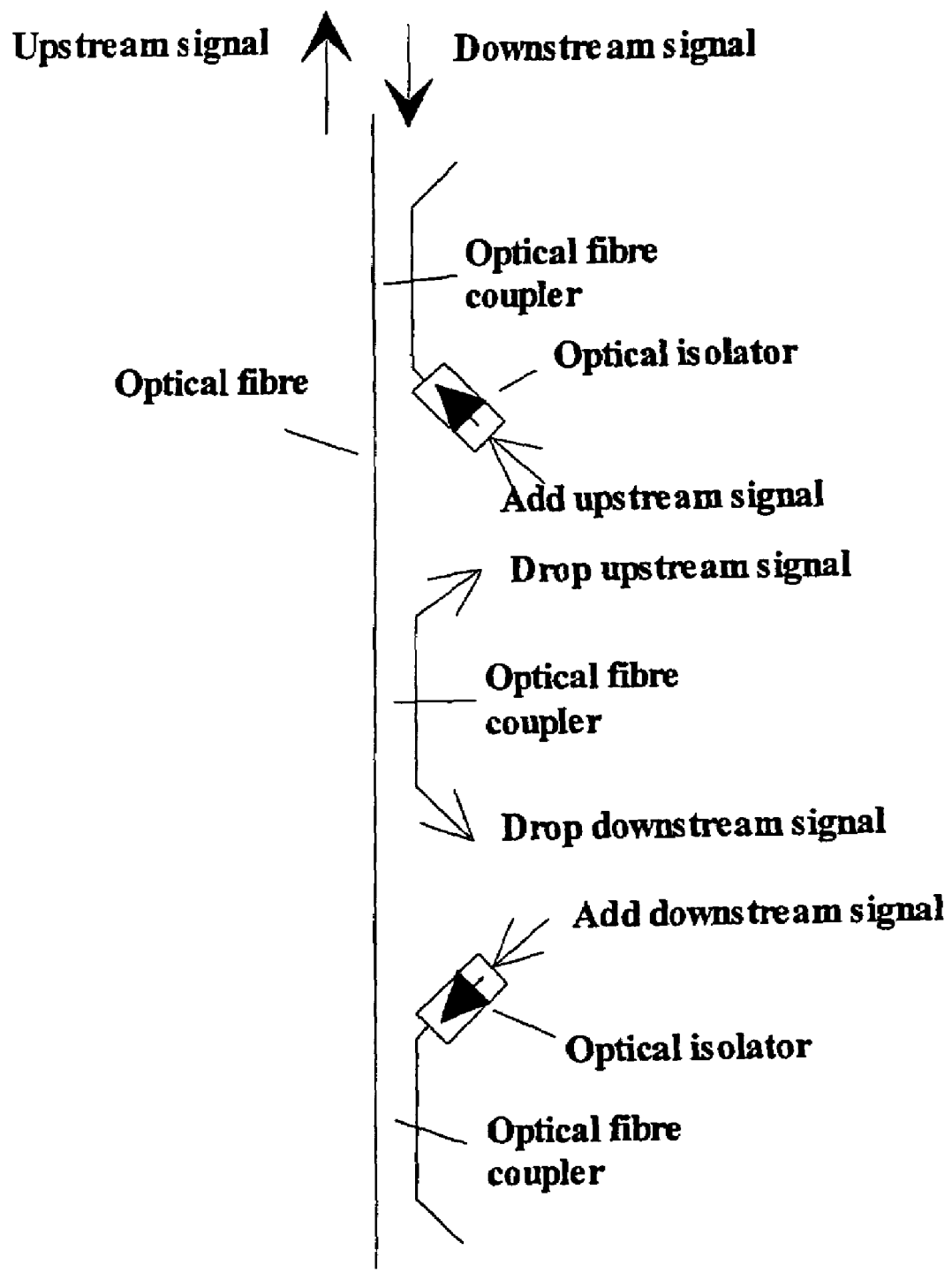
FIGS. 26 and 27 show possible designs of a bidirectional optical coupler for use in the FIG. 23 and FIG. 24 embodiments.
Figure 27:
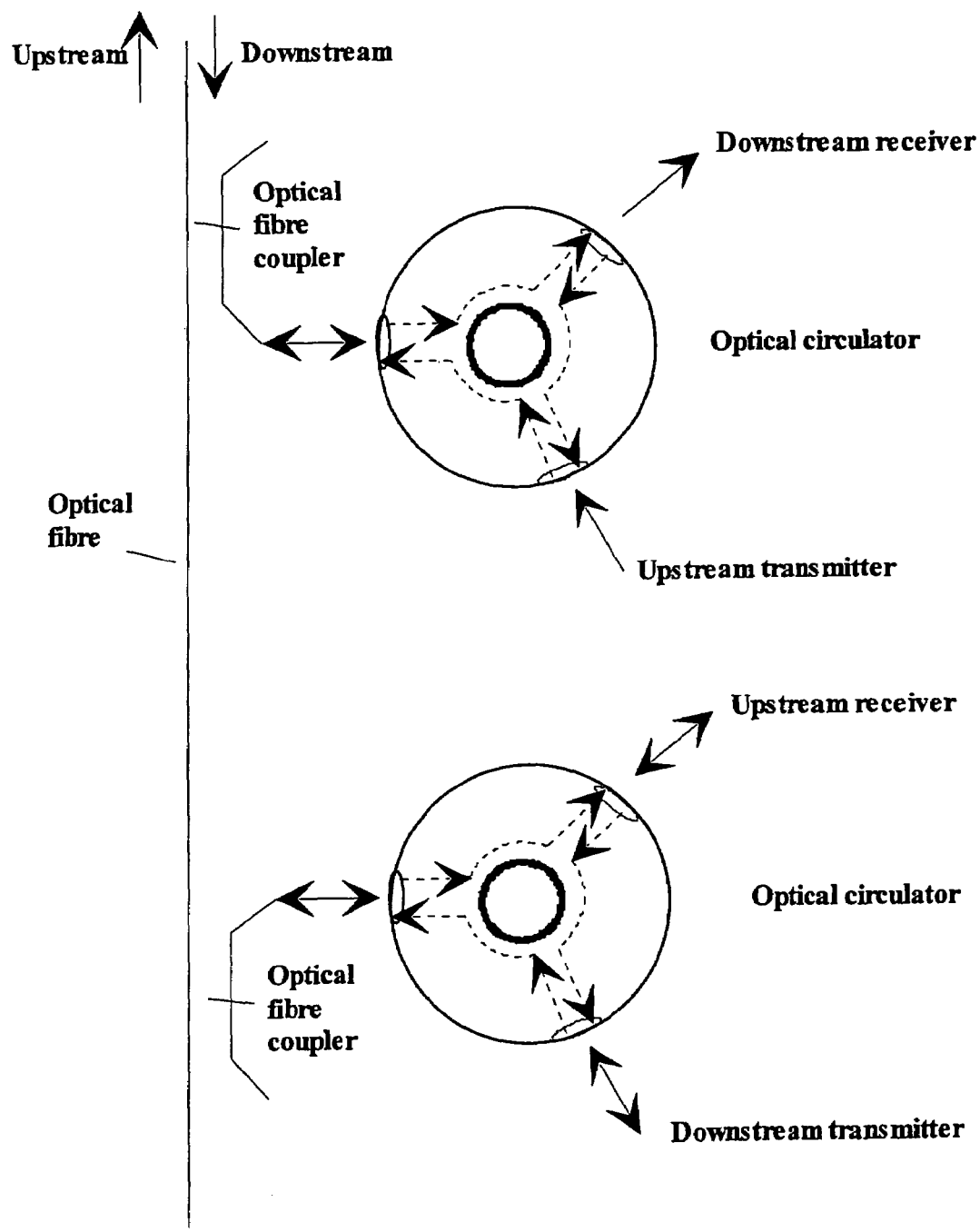

Signals are coupled in and out of the ring or bus using an optical coupler. Designs for the optical coupler are given in FIGS. 25 to 27. FIG. 25 shows a design for use in a unidirectional ring or bus (traffic only transmitted in one direction on the fibre). FIGS. 26 and 27 show designs for a bidirectional ring or bus (traffic transmitted in both directions over a single fibre). It is equally possible to use one fibre for each direction of transmission.

The terminal equipment may use any form of optical transmission (e.g. including Synchronous Digital Hierarchy (SDH) or Plesiochronous Digital Hierarchy (PDH)).

The invention claimed is:

1. An optical network comprising:
a plurality of optical network units; and
an optical source connected and arranged to transmit light signals to each of said plurality of optical network units;

wherein said optical source is capable of transmitting light signals at one or more of a plurality of different wavelengths, each optical network unit is preconfigured to accept a predetermined subset of more than one of said wavelengths without receiving a control signal indicating a wavelength of a light signal transmitted by said optical source to be accepted by the optical network unit, and each wavelength of said plurality is accepted by a predetermined different subset of optical network units, the optical network further comprising:

control circuitry operable to cause said optical source to transmit light signals at one or more selected such wavelengths corresponding to respective desired subsets of said optical network units and further operable to effect a requested bandwidth redistribution by changing said one or more wavelengths selected for transmission to one or more different wavelengths corresponding to one or more different desired subsets of optical network units, to thereby effect the requested bandwidth redistribution without sending control signals to, and receiving control signals by, the optical network units indicating wavelengths of light signals transmitted by said optical source to be accepted by the optical network units.

2. An optical network as claimed in claim 1, wherein said control circuitry is operable to cause said optical source to transmit light signals at two or more selected wavelengths corresponding to two or more desired subsets of said optical network units.

3. An optical network as claimed in claim 2, wherein said two or more desired subsets together include all of said optical network units.

4. An optical network as claimed in claim 1, wherein the optical source comprises a plurality of fixed wavelength lasers, each laser being operable to transmit at one of said plurality of wavelengths.

5. An optical network as claimed in claim 1, wherein the optical source comprises one or more tunable lasers.

6. An optical network as claimed in claim 5, wherein the number of tunable lasers is equal to the number of desired subsets of optical network units.

7. An optical network as claimed in claim 1, wherein at least one of the optical network units comprises a filter, which passes only those wavelengths that are to be accepted by that optical network unit, and a receiver, which responds to light energy which is passed by the filter.

8. An optical network as claimed in claim 7, wherein said filter comprises a fixed filter.

9. An optical network as claimed in claim 7, wherein said filter comprises a Fabry-Perot filter.

10. An optical network as claimed in claim 7, wherein said filter comprises a tunable filter.

11. An optical network as claimed in claim 7, wherein said filter comprises a wavelength division demultiplexer which splits the incoming signal into various wavelengths, and wherein only those wavelengths which are to be passed by the filter are connected to the receiver.

12. An optical network as claimed in claim 1, wherein, in the case of two or more desired subsets, a particular optical network unit is not included in more than one of the two or more desired subsets of said optical network units.

13. An optical network as claimed in claim 1, wherein the network is a passive optical network.

14. An optical network as claimed in claim 1, wherein signals transmitted from the optical source to an optical network unit are carried by optical fibers.

15. An optical network as claimed in claim 1 as applied to an optical ring architecture.

16. An optical network as claimed in claim 1, as applied to a bus architecture.

17. An optical network as claimed in claim 1, wherein the optical source is located within one of the optical network units.

18. Control circuitry for use in an optical network, which network comprises a plurality of optical network units and an optical source connected and arranged to transmit light signals to each of said plurality of optical network units, said optical source being capable of transmitting light signals at one or more of a plurality of different wavelengths, each optical network unit being pre-configured to accept a predetermined subset of more than one of said wavelengths without receiving a control signal indicating a wavelength of a light signal transmitted by said optical source to be accepted by the optical network unit, and each wavelength of said plurality being accepted by a predetermined different subset of optical network units, the control circuitry being operable to cause said optical source to transmit light signals at one or more selected such wavelengths corresponding to respective desired subsets of said optical network units and further being operable to effect a requested bandwidth redistribution by changing said one or more wavelengths selected for transmission to one or more different wavelengths corresponding to one or more different desired subsets of optical network units, to thereby effect the requested bandwidth redistribution without sending control signals to, and receiving control signals by, the optical network units indicating wavelengths of light signals transmitted by said optical source to be accepted by the optical network units.

19. Control circuitry as claimed in claim 18 which is operable to cause said optical source to transmit light signals at two or more selected wavelengths corresponding to two or more desired subsets of said optical network units.

20. Control circuitry as claimed in claim 19, wherein said two or more desired subsets together include all of said optical network units.

21. Control circuitry as claimed in claim 18, wherein, in the case of two or more desired subsets, a particular optical network unit is not included in more than one of the two or more desired subsets of said optical network units.

22. A dynamic bandwidth assignment method for an optical network comprising a plurality of optical network units and an optical source connected and arranged to transmit light signals to each of said plurality of optical network units, said optical source being capable of transmitting light signals at one or more of a plurality of different wavelengths, each optical network unit being pre-configured to accept a predetermined subset of more than one of said wavelengths without receiving a control signal indicating a wavelength of a light signal transmitted by said optical source to be accepted by the optical network unit, and each wavelength of said plurality being accepted by a predetermined different subset of optical network units, in which method:

light signals are transmitted by said optical source at one or more wavelengths, selected from said plurality of wavelengths, corresponding to one or more desired subsets of optical network units, and, in response to a required bandwidth redistribution, said one or more wavelengths at which light signals are transmitted by said optical source are changed to one or more different wavelengths, selected from said plurality, which correspond to one or more different desired subsets of optical network units, to thereby effect the required bandwidth redistribution without sending control signals to, and receiving control signals by, the optical network units indicating wavelengths of light signals transmitted by said optical source to be accepted by the optical network units.

23. A method as claimed in claim 22, wherein light signals are transmitted by said optical source at two or more wavelengths, selected from said plurality of wavelengths, corresponding to two or more desired subsets of optical network units.

24. A method as claimed in claim 23, wherein said two or more desired subsets together include all of said plurality of optical network units.

25. A method as claimed in claim 22, wherein, in the case of two or more desired subsets, a particular optical network unit is not included in more than one of the two or more desired subsets.

26. An optical network comprising:
a plurality of optical network units; and
optical source means connected and arranged to transmit light signals to each of said plurality of optical network units;
wherein said optical source means are capable of transmitting light signals at one or more of a plurality of different wavelengths, each optical network unit is pre-configured to accept a predetermined subset of more than one of said wavelengths without receiving a control signal indicating a wavelength of a light signal transmitted by said optical source means to be accepted by the optical network unit, and each wavelength of said plurality is accepted by a predetermined different subset of optical network units, the optical network further comprising:

control means operable to cause said optical source means to transmit light signals at one or more selected such wavelengths corresponding to respective desired subsets of said optical network units and further operable to effect a requested bandwidth redistribution by changing said one or more wavelengths selected for transmission to one or more different wavelengths corresponding to one or more different desired subsets of optical network units, to thereby effect the requested bandwidth redistribution without sending control signals to, and receiving control signals by, the optical network units indicating wavelengths of light signals transmitted by said optical source means to be accepted by the optical network units.

* * * * *

UNITED STATES PATENT AND TRADEMARK OFFICE
CERTIFICATE OF CORRECTION

| | | |
|---|---|---|
| PATENT NO. | : 7,016,608 B1 | Page 1 of 1 |
| APPLICATION NO. | : 09/914575 | |
| DATED | : March 21, 2006 | |
| INVENTOR(S) | : Peter Raymond Ball et al. | |

It is certified that error appears in the above-identified patent and that said Letters Patent is hereby corrected as shown below:

Column 10, line 62, change "The invention" to -- What is --.

Signed and Sealed this

Fourth Day of July, 2006

JON W. DUDAS
*Director of the United States Patent and Trademark Office*